Patented Jan. 10, 1933

1,893,945

UNITED STATES PATENT OFFICE

OSCAR KASELITZ, OF BERLIN, GERMANY

PRODUCTION OF POTASSIUM NITRATE

No Drawing. Application filed June 17, 1929, Serial No. 371,713, and in Germany February 11, 1929.

My invention refers to the production of potassium nitrate, more especially by reacting on potassium chloride with nitric acid.

As is well known to those skilled in the art, difficulties are encountered in this process in separating out the chlorine resulting from the decomposition of the potassium chloride, without experiencing losses in the valuable nitrogen oxides. The necessity of removing by evaporation the water introduced together with the nitric acid involves further economical losses.

I have now ascertained that these drawbacks can be avoided according to the present invention, if to a solution rich in nitric acid potassium chloride is added at ordinary or elevated temperature in such quantity that at ordinary temperature only potassium nitrate separates out, while the solution is approximately saturated with potassium chloride. The acid solution obtained in the reaction is then brought to the original concentration, adapted for the formation of potassium nitrate from potassium chloride, by acting thereon with nitrous gases and air in an absorption apparatus. During this operation only nitrosyl chloride escapes, but no other chlorine compounds, nor elementary chlorine. Such gases which may form during the formation of the potassium nitrate, more especially at an elevated temperature, namely hydrogen chloride and/or elementary chlorine, are added to the nitrous gases and thus reintroduced into the starting solution.

The nitrosyl chloride is now decomposed into nitrogen monoxide and chlorine. The chlorine is removed, while the nitrogen monoxide is added to the nitrous gases, which may for instance result from the combustion of ammonia.

It may prove advantageous to first separate the nitrosyl chloride from the inert gases. I prefer using for this purpose absorbing media, such as silica gel, active carbon or the like or ferric chloride. In the latter case an addition compound $FeCl_3.NOCl$ is formed. In every case a complete separation of the nitrosyl chloride from the valueless diluting gases (mainly nitrogen) is obtained.

The absorbed nitrosyl chloride is set free by heating the absorbing medium. It is then decomposed into nitrogen monoxide and chlorine in a suitable manner, for instance by acting thereon with lime, iron or ferrous chloride. The $FeCl_3$ or $CaCl_2$ formed in this reaction is removed, the nitrogen monoxide is quantitatively returned into the operation.

The heat required for expelling the nitrosyl chloride from the absorbing media and for splitting off the nitrogen monoxide may be furnished by the hot nitrous gases resulting from the combustion of ammonia. Heat transmission may be effected directly or indirectly. I prefer leading for instance the two nitrous gases or part of them first over the absorbing medium saturated with nitrosyl chloride and thereafter over caustic lime which is thus heated to the temperature required for the decomposition of the nitrosyl chloride.

Example 49 kilograms of a solution containing 46.5% $HNO_3$, 16.5% $KNO_3$ and 0.4% $KCl$ are stirred with 15 kilograms potassium chloride. After cooling down the solution contains 31.5% $HNO_3$ and 3.5% $HCl$, while 20 kilograms potassium nitrate separate out. The liquid separated from the potassium nitrate is now treated in an absorption apparatus with nitrous gases and air, until all the chlorine has escaped in the form of nitrosyl chloride, whereby a solution having the composition of the solution originally used is obtained. 1.3 cubic metres NO are required in this operation and there escapes a mixture of 1.2 cubic metres NOCl and air.

In practising this process I may for instance introduce the nitrous gases already during the reaction between potassium chloride and nitric acid, so that the concentration of $HNO_3$ in the reaction solution remains substantially constant and the reaction is greatly expedited.

I may also operate in a continuous manner, to the reaction solution fresh potassium chloride being continuously added, and the nitric acid being permanently maintained at the concentration required for a fast reaction by simultaneously introducing nitrous gases and air, the potassium nitrate formed being removed at the same time.

The novel process involves a number of great advantages as compared with similar processes hitherto suggested. The introduction of water is avoided altogether, merely nitrous gases and potassium chloride being introduced, and it is therefore unnecessary to remove water by evaporation or to remove any solution. For this reason all losses of nitrogen and potassium are avoided also.

The losses of valuable nitrogen oxides resulting by imperfect absorption, when producing nitric acid, are avoided also, the absorption of the nitrosyl chloride occurring in a practically quantitative manner.

The potassium nitrate obtained according to this process is substantially free from chlorine. The acid solution adhering to the salt can easily be removed by filtering or centrifuging, followed by washing. It is, however, also possible to neutralize the adhering solution with potassium carbonate or ammonia, whereby a neutral potassium nitrate is obtained in a simple manner. This latter mode of proceeding involves the further advantage that part of the water is removed, which can then be replaced by the dilute nitric acid which is obtained by cooling the nitrous gases resulting in the combustion of ammonia.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing potassium nitrate comprising acting on potassium chloride with a solution of nitric acid separating the potassium nitrate formed, treating the acid solution remaining over after separation of potassium nitrate with nitrous gases and air in order to freshly form nitric acid and removing chlorine in the form of nitrosyl chloride substantially free from other chlorine compounds and from elementary chlorine, decomposing the nitrosyl chloride and adding the nitrogen oxide resulting in this decomposition to the nitrous gases.

2. The method of producing potassium nitrate comprising acting on potassium chloride with a solution of nitric acid, separating the potassium nitrate formed, treating the acid solution remaining over after separation of potassium nitrate with nitrous gases and air in order to freshly form nitric acid and removing chlorine in the form of nitrosyl chloride substantially free from other chlorine compounds and from elementary chlorine, separating the nitrosyl chloride from the inert gases by adsorption, decomposing the nitrosyl chloride and adding the nitrogen oxide resulting in this decomposition to the nitrous gases.

3. The method of producing potassium nitrate, comprising acting on potassium chloride with a solution of nitric acid by introducing nitrous gases and air into said solution in order to freshly form nitric acid therein and removing chlorine therefrom in the form of nitrosyl chloride substantially free from other chlorine compounds and from elementary chlorine, decomposing the nitrosyl chloride and adding to the nitrous gases the nitrogen oxide resulting in this decomposition.

4. The method of producing potassium nitrate comprising continuously adding to a solution of nitric acid potassium chloride and a gas mixture containing nitrous gases and air to continuously form potassium nitrate, removing the same, and nitrosyl chloride, substantially free from other chlorine compounds and from elementary chlorine, decomposing the nitrosyl chloride and adding to the nitrous gases the nitrogen oxide resulting in this decomposition.

5. The method of producing potassium nitrate comprising continuously adding to a solution of nitric acid potassium chloride and a gas mixture containing nitrous gases and air to continuously form potassium nitrate, removing the same, and nitrosyl chloride substantially free from other chlorine compounds and from elementary chlorine, decomposing the nitrosyl chloride and adding to the nitrous gases the nitrogen oxide resulting in this decomposition, the relative amounts of potassium chloride, nitrous gases and air being controlled to maintain a substantially constant concentration of the nitric acid solution.

In testimony whereof I affix my signature.

OSCAR KASELITZ.